US011080969B2

(12) United States Patent
Martineck, Sr.

(10) Patent No.: US 11,080,969 B2
(45) Date of Patent: Aug. 3, 2021

(54) SYSTEM AND METHOD FOR REMOTE DISPLAY OF SCRATCH-OFF LOTTERY TICKETS PRIOR TO SALE

(71) Applicant: Scientific Games International, Inc., Newark, DE (US)

(72) Inventor: Jeffrey D. Martineck, Sr., Johns Creek, GA (US)

(73) Assignee: Scientific Games International, Inc., Newark, DE (US)

( * ) Notice: Subject to any disclaimer, the term of this patent is extended or adjusted under 35 U.S.C. 154(b) by 251 days.

(21) Appl. No.: 15/971,557

(22) Filed: May 4, 2018

(65) Prior Publication Data

US 2019/0340865 A1 Nov. 7, 2019

(51) Int. Cl.
*A63F 13/00* (2014.01)
*G07F 17/32* (2006.01)

(52) U.S. Cl.
CPC .................................. *G07F 17/329* (2013.01)

(58) Field of Classification Search
CPC .................................................... G07F 17/329
See application file for complete search history.

(56) References Cited

U.S. PATENT DOCUMENTS 4,953,895 A 9/1990 Goussios
6,530,842 B1 3/2003 Wells et al.
6,695,699 B2 2/2004 Beaulieu
9,640,018 B2 5/2017 Finocchio et al.
2004/0176158 A1 9/2004 Baldwin
2004/0254007 A1 12/2004 Reep
2005/0059465 A1 3/2005 Bozeman
2005/0149393 A1 7/2005 Leof
2006/0030388 A1 2/2006 Kane et al.
2006/0160602 A1 7/2006 Blythe et al.
2008/0220840 A1* 9/2008 Katz ...................... G07F 17/32 463/16
2009/0061980 A1 3/2009 Holton et al.
2009/0221342 A1* 9/2009 Katz .................. G07F 17/3276 463/17
2012/0202571 A1 8/2012 Stanek et al.
2013/0324207 A1* 12/2013 Stanek ................. G07F 17/329 463/17

OTHER PUBLICATIONS

EP Search Report, dated Aug. 7, 2019.

* cited by examiner

*Primary Examiner* — Omkar A Deodhar
*Assistant Examiner* — Eric M Thomas
(74) *Attorney, Agent, or Firm* — Dority & Manning, P.A.

(57) ABSTRACT

A scratch-off lottery ticket game system and method include lottery tickets contain a first set of play characters and instructions for receiving a second set of predetermined play characters assigned to the lottery ticket via a mobile smart device. At time of purchase of the lottery ticket, the system activates the ticket in a computer file at a central server. Upon receiving a request from the player that identifies the lottery ticket, the server verifies the activated status of the lottery ticket and downloads the second set of predetermined play characters to the mobile smart device. The player removes the scratch-off coating from the first set of play characters on the lottery ticket and compares them second set of play characters to reveal a predetermined outcome of the lottery ticket.

18 Claims, 6 Drawing Sheets

SYSTEM AND METHOD FOR REMOTE DISPLAY OF SCRATCH-OFF LOTTERY TICKETS PRIOR TO SALE

FIELD OF THE INVENTION

The present invention generally relates to a system and method for implementing a scratch-off ("instant") lottery ticket game, and more particularly to a method and system wherein the scratch-off lottery tickets can be displayed remotely from a point-of-sale terminal at a retail location prior to sale.

BACKGROUND

"Scratch-off" or "instant-win" lottery tickets have enjoyed immense popularity in the lottery industry for decades. These games offer distinct advantages to the lottery authorities and are attractive to a broad spectrum of players.

For security and other reasons, it has been the conventional practice that such lottery tickets are housed and dispensed at the point-of-sale ("POS") terminal at the respective retail establishment where they are dispensed by the retail clerk upon a specific request from a purchaser. The conventional "manual" dispensers require the retail clerk to manually grasp and pull the requested number of tickets from a bin mounted relatively close to the POS terminal. This process takes the clerk's time and attention from other responsibilities and customers, and the storage bins take up valuable space at or near the POS terminal and counter.

Electronic ticket dispenser arrays are being developed that are interfaced with a lottery terminal or POS terminal, wherein the tickets are automatically dispensed from a bin in the array upon receipt of dispense command entered by the clerk via the lottery terminal or POS terminal. Although providing increased functionality, these systems also require the clerk's time and attention to initiate the dispense sequence and are also placed at or near the POS counter.

An issue with placement of the scratch-off lottery tickets at a location within the retail establishment remote from the POS counter/terminal and accessible to purchasers has been the concern that unscrupulous persons acting in cohorts with the retail clerk will clandestinely play the tickets prior to actually paying for the tickets. Upon finding a winning ticket, the clerk will then go through the process of accepting payment and entering the ticket identification into the lottery system as if it had been legitimately purchased, wherein the ticket is then flagged as activated (e.g., paid-for and capable of being subsequently redeemed).

U.S. Pat. No. 9,640,018 describes a system and method wherein a player is provided with a free pre-printed first game piece having a first set of game play data that is insufficient to ascertain an outcome of the lottery game. Responsive to receiving the indication that the player wishes to actually purchase the lottery ticket, the game outcome is then determined and a second set of game play data chosen based on the outcome, so that a comparison of the first set of game play data and the second set game play data is indicative of the game outcome. The second set of game data may be provided to the player on a second game piece also having data associating the second game piece with the first game piece and a unique identifier. When a claim for a prize is received from the player, the unique identifier may be used to confirm whether a prize is due the player.

The present system and method seek to provide a secure and reliable means to present and make scratch-off lottery tickets accessible to purchasers at a location remote from the POS counter/terminal that addresses the concern noted above.

SUMMARY

Objects and advantages of the invention will be set forth in part in the following description, or may be obvious from the description, or may be learned through practice of the invention.

In a particular embodiment of the present invention, a method is provided for conducting a scratch-off lottery ticket game. The method includes configuring pre-printed scratch-off lottery tickets ("lottery tickets") with a game play area containing a first set of play characters covered by a scratch-off coating, and indicia instructing a player how to receive a second set of predetermined play characters assigned to the lottery ticket via a mobile smart device. At a retail establishment, the lottery tickets are provided in a manner accessible to the players, wherein the player physically retrieves the lottery ticket of their choice and presents the lottery ticket to a point-of-sale ("POS") station for purchase. For example, the lottery tickets may be provided on a rack in an aisle within the retail establishment remote from the POS station. In this manner, the clerk at the POS station need not be involved with the player's initial selection of a lottery ticket.

At the time of purchase by the player, the lottery ticket is identified and flagged as activated for subsequent play and redemption (in the case of a winning ticket) in a computer file associated with the lottery ticket at a central server.

At a later time after purchase of the lottery ticket, the central server receives a request from the player for the second set of play characters, wherein the request identifies the lottery ticket. The central server verifies the activated status of the lottery ticket and then retrieves and downloads the second set of predetermined play characters to the mobile smart device. If not already done, the player then removes the scratch-off coating from the first set of play characters on the lottery ticket and compares the first set of play characters with the down-loaded second set of play characters to reveal a predetermined outcome of the lottery ticket. For example, as with a number of conventional scratch-off lottery tickets the number of matches between game play characters on the ticket (the second set of play characters) and a plurality of player characters on the ticket (the first set of play characters) reveals the predetermined win/loss outcome of the lottery ticket, as well as the prize amount.

As with conventional scratch-off lottery tickets, winning lottery tickets can be redeemed by the player presenting the lottery ticket to the retail establishment or an authorized redemption location, wherein a validation code on the lottery ticket (which may the same as or different from the unique identifier) is used to access a validation file (which may the same as or different from the computer file discussed above) that contains the ticket information needed to assure that the ticket is a valid winning ticket that was purchased and activated.

In a particular embodiment, the lottery tickets are configured with a unique identifier, such as a scanable code (e.g. barcode or QR code) or alpha-numeric sequence, that is transmitted by the player via the mobile smart device to make the request for the second set of play characters. This unique code is used by the central server to retrieve the second set of play characters from the individual computer file associated with the lottery ticket and download the second set of player characters to the mobile smart device.

The second set of play characters are revealed to the player via the mobile smart device in any readable format or manner, preferably in a visual representation enabled by an application running on the mobile smart device that visually connects the information regarding the second set of play numbers to the respective lottery ticket. In a particularly unique embodiment, the central server stores and downloads a digital ticket template to the mobile smart device along with the second set of play characters, wherein this template is generic to all of the lottery tickets in a common game. For example, a common game embodied by the plurality of lottery tickets may be a "Match-Game Jackpot" theme game wherein essentially the only variable indicia on the tickets is the play characters and the graphics, instructions, and other indicia are static from one ticket to the next. The digital template may contain any combination of the static aspects of the common game, wherein the second set of numbers is combined with the digital template. For example, the second set of play characters may be presented in a simulated play area in the digital template.

Because they contain only static indicia, it is not necessary to generate and store an individual digital template in the computer file for each lottery ticket. The digital templates for the respective different common games may be stored at the central server remote from the individual computer files for the lottery tickets. Once the central server identifies the common game related to the unique identifier transmitted by the player, the digital template for this game is retrieved by the central server and transmitted with the second set of play characters.

In a particular embodiment, the method includes configuring each of the lottery tickets with a security image, wherein the player also identifies or provides the security image to the central sever via their mobile smart device when making their request for the second set of play characters. This security image serves distinct security functions. For example, it ensures that a genuine person holding a purchased ticket is making the request to the central server for the second set of play characters, and not a robot or other automated means attempting to defraud the lottery.

In a desirable embodiment, the security image is printed on the lottery ticket with at least a 600 dpi resolution. In this way, detailed identification features can be embedded in the image that are not readily reproducible by persons attempting to defraud the lottery system with forged tickets. In one embodiment, the player is instructed to scan the image with their mobile smart device and transmit the image to the central sever along with their request for the second set of play characters. In an alternative embodiment, the player may be prompted to answer a question regarding the image, wherein the high resolution image (at least 600 dpi) enables more detail-oriented questions regarding the image.

It is not necessary that a unique security image be generated for each lottery ticket. In a particular embodiment, a set of the security images are generated (e.g., four high resolution images of dogs or cats), wherein one of these four images is randomly assigned to and printed on each lottery ticket such that a plurality of the lottery tickets share the same security image. The security image for the lottery ticket is stored with the computer file associated with the lottery ticket and compared with the image scanned or otherwise identified by the player upon making the request for the second set of play characters.

The present invention also encompasses various system embodiments for conducting a scratch-off lottery ticket game in accordance with the methods discussed above. For example, a system embodiment includes a plurality of scratch-off lottery tickets ("lottery tickets"), wherein each of the lottery tickets includes a unique identifier and a game play area containing a first set of play characters covered by a scratch-off coating, and indicia instructing a player how to receive a second set of predetermined play characters assigned to the lottery ticket via a mobile smart device. The lottery tickets are presentable at a retail establishment in a manner such that the player physically retrieves the lottery ticket of their choice and presents the lottery ticket to a point-of-sale ("POS") station for purchase without assistance or intervention by a store clerk.

The system includes an individual computer file associated with each lottery ticket, the computer file including a second set of predetermined play characters assigned to the lottery ticket such that the outcome of the game embodied by the lottery ticket is predetermined.

The system includes a central server, wherein the computer files are stored at or accessible by the central server. The central server is configured to: at a time of purchase of the lottery ticket by the player, flag the lottery ticket in the computer file associated with the lottery ticket as activated for subsequent play; upon receiving a request from the player with the unique identifier of the lottery ticket, verify the activated status of the lottery ticket; and retrieve and download the second set of predetermined play characters from the computer file to the mobile smart device. If not previously done, the player removes the scratch-off coating from the first set of play characters on the lottery ticket and compares the first set of play characters with the downloaded second set of play characters to reveal the predetermined outcome of the lottery ticket.

The unique identifier on the lottery ticket may be provided as a scanable code or alpha-numeric sequence that is scanned or otherwise transmitted by the player via the mobile smart device to make the request for the second set of play characters.

The system may further include a digital ticket that is generic to all of the lottery tickets in a common game, as discussed above. The central server is further configured to download the digital template to the mobile smart device wherein the second set of play characters are combined with the digital template in a visual representation on the mobile smart device. The digital templates may be stored at the central server remote from the individual computer files for the lottery tickets.

Within the scope of a system embodiment, each lottery ticket may further include a security image, as discussed above, wherein the player identifies or provides the security image to the central sever via the mobile smart device when making their request for the second set of play characters.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Generally, the present disclosure is directed to a computer-based, scratch-off lottery ticket game system and associated method that enables remote location of the lottery tickets in a retail establishment. At the retail establishment, the lottery tickets can be provided in a manner accessible to the players, wherein a player physically retrieves the lottery ticket of their choice and presents the lottery ticket to a point-of-sale ("POS") station for purchase. For example, the lottery tickets may be provided on a rack in an aisle within the retail establishment remote from the POS station. In this manner, the clerk at the POS station need not be involved with the player's initial selection of a lottery ticket.

Referring to the figures in general, individual scratch-off lottery tickets ("lottery tickets") 14 are specifically configured for use with embodiments of a game system 50 (FIGS. 4 and 5) and associated method 100 (FIG. 7) in accordance with aspects of the invention. Those skilled in the art appreciate that a set or production lot of such tickets 14 are generally printed for a common game, wherein the prize structure that generates the expected value for the common game is embodied by winning tickets 14 distributed throughout the ticket lot.

Figure 1:
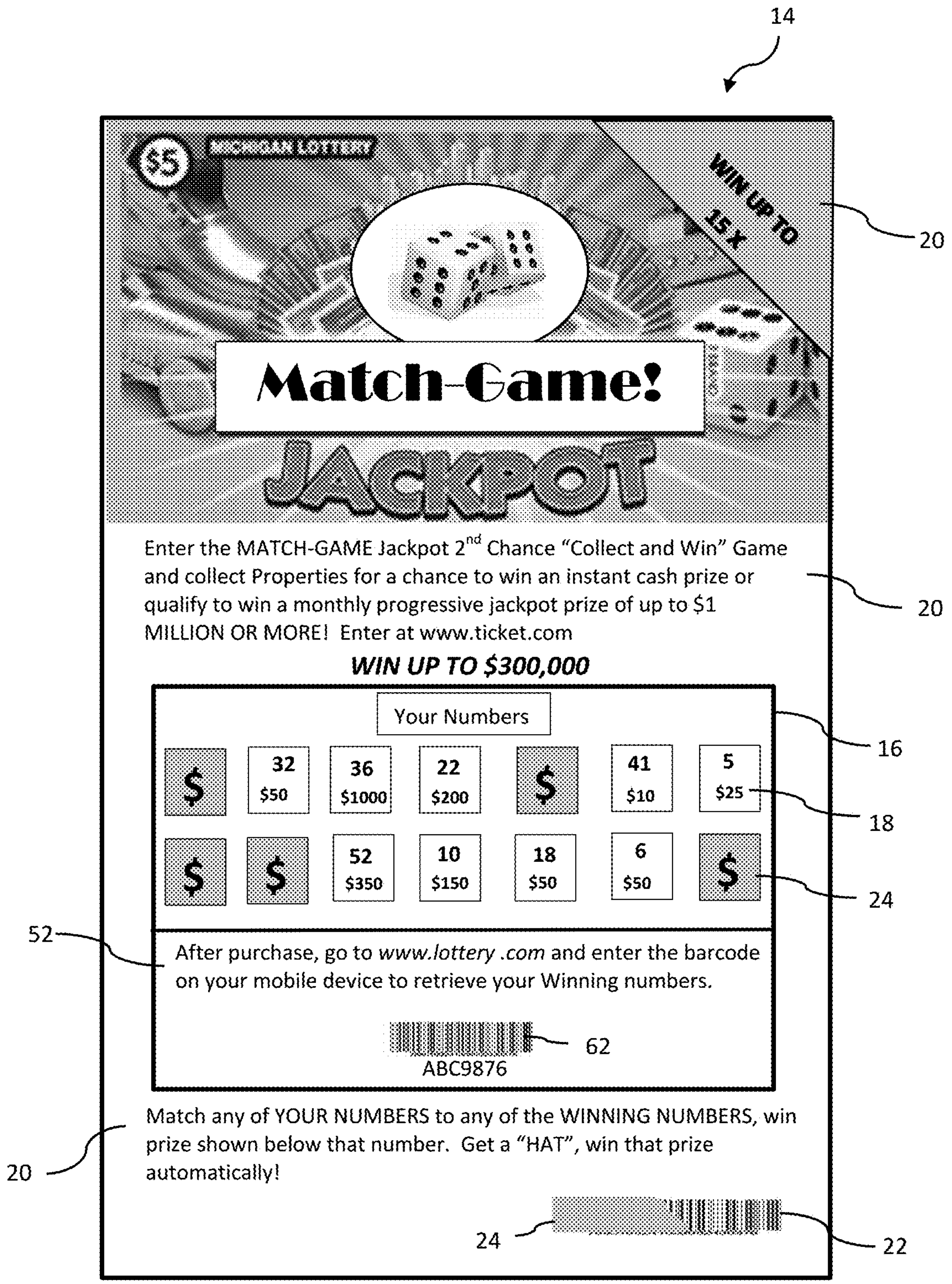
FIG. 1 depicts an embodiment of a scratch-off lottery ticket that may be used with the game systems and methods according to the present invention.
Figure 2:
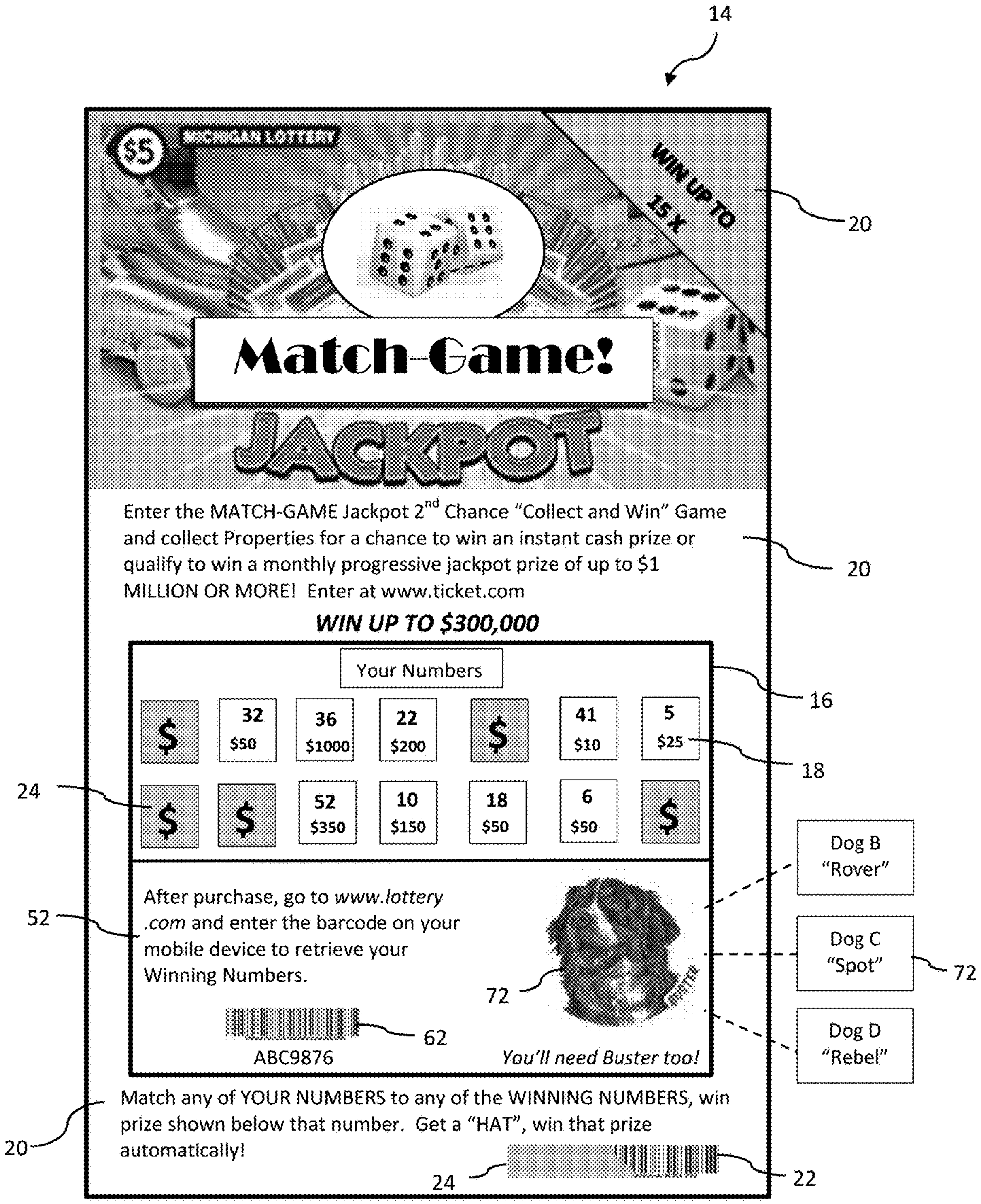
FIG. 2 depicts an alternate embodiment of a scratch-off lottery ticket that may be used with the game systems and methods according to the present invention.

Referring to FIGS. 1 and 2, exemplary lottery tickets 14 are depicted. The lottery ticket 14 includes game instruction graphics and indicia 20 printed that explain to a player how to play the game embodied on the master ticket 14, as well as what constitutes a winning ticket and the prize amounts. The game instruction indicia 20 may be considered as "static" indicia in that, for a given common game, it does not change from one lottery ticket 14 to the other within the set of lottery tickets 14. For example, in the depicted embodiments, the common game is a "Match-Game Jackpot" instant scratch-off lottery game, and the game instruction indicia 20 does not change from one ticket to another for the "Match-Game Jackpot" game.

Still referring to FIG. 1, as is well-known, each lottery ticket 14 includes a game play area 16 wherein variable game play indicia 18 is provided and covered by a scratch-off coating (SOC) layer 24. In the context of the present invention, this set of game play indicia 18 may also be considered as a "first set of play characters" that are compared to a "second set of play characters" (discussed below) to reveal the winning or losing status of the lottery ticket 14. The player must eventually remove the SOC layer 24 to uncover the underlying game play indicia 18. Thus, the first set of play characters 18 may be considered as "variable" indicia in that it changes from one lottery 4 to another.

In the depicted common game embodied by the lottery tickets 14 in the figures, the player is presented with a matrix of "Your Numbers" in the game player area 16 that serve as the first set of play characters 18. The game instruction indicia 20 conveys to the player that a match of any of the "Your Numbers" with any of the "Winning Numbers" (constituting the second set of play characters 54) that the player is subsequently provided via the identified website wins the prize show below the number, as well as other prize potentials. Additional game instruction indicia 20 instructs the player on how to access the website and obtain the second set of play characters 54.

It should be appreciated that the first 18 and second 54 sets of play characters may be interchanged. For example, the printed ticket 14 may include the Winning Numbers as the first set of play characters 18, whereas the Your Numbers may be provided in a download as the second set of play characters 54.

Each lottery ticket 14 includes an identifier code 62 printed thereon that is unique to the lottery ticket 14, such as a scannable barcode (as depicted in the figures) or alphanumeric code. This code 62 links or associates the lottery ticket 14 to a ticket-specific computer file 56 at a central server 58 (FIGS. 3 and 4), as described in greater detail below. The code 62 may also identify the lottery ticket 14 with a common game computer file 68 for reasons described in greater detail below. For example, the ticket-specific identifier code 62 may include game identifying portions or components that are common for all of the codes 62 for lottery tickets 14 belonging to a common game.

Generally, conventional scratch-off lottery tickets include a validation code 22 printed thereon, which may also be covered by a SOC layer 24, that links the ticket to a validation file contained at the central server 58 (or otherwise accessible by the central server 58). Those skilled in the art appreciate that the validation file contains ticket-specific information for validation and pay-out (redemption) of the lottery ticket 14. In certain embodiments of the present system and method, the function of the unique ticket identifier code 62 is served by the validation code 22 for the lottery ticket 14 such that only a single code need be printed on the lottery ticket 14. However, in alternate embodiments depicted in the figures, the unique ticket identifier code 62 is separate from the validation code, which may be desirable for security reasons.

Figure 3:
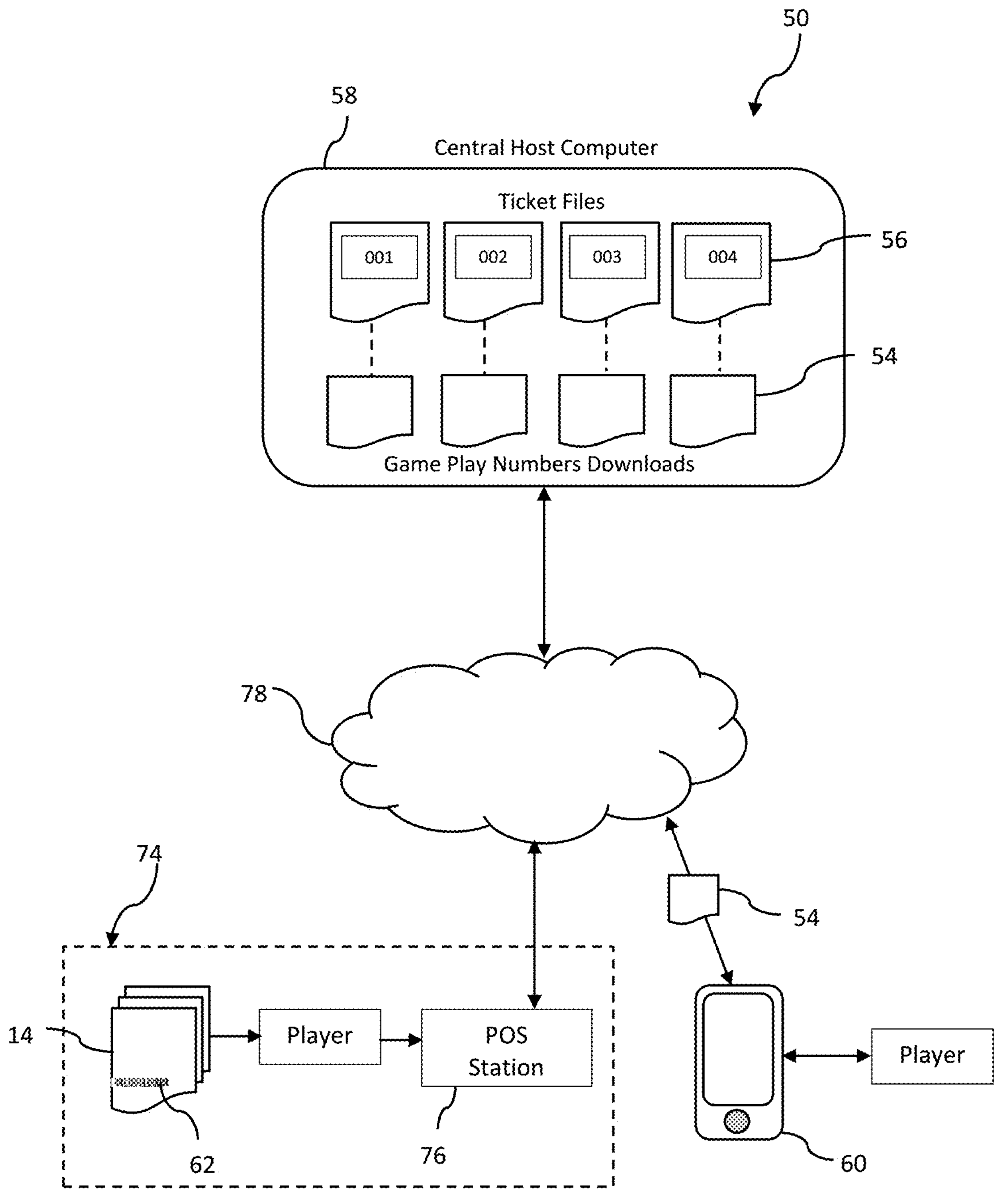
FIG. 3 is a diagram of a system component and method configuration according to an embodiment of the invention.

Referring to FIG. 3, at a retail establishment 74, the lottery tickets 14 are provided in a manner accessible to the players without intervention or assistance from a retail clerk, wherein the player physically retrieves the lottery ticket 14 of their choice and presents the lottery ticket 14 to a point-of-sale ("POS") station 76 for purchase. For example, the lottery tickets 14 may be provided on a rack in an aisle within the retail establishment 74 remote from the POS station 76. In this manner, the clerk at the POS station 76 need not be involved with the player's initial selection of a lottery ticket.

At the time of purchase by the player, the lottery ticket 14 is scanned and identified to the central server 58. For example, the retail clerk may use a portable scanner or scanner configured with a lottery terminal or POS terminal to scan the validation code 22 or ticket identifier code 62 and transmit the code to the central server 58 which, in turn, flags the lottery ticket 14 as "activated" (e.g. legitimately purchased) for subsequent play and redemption (in the case of a winning ticket) in a computer file 56 associated with the lottery ticket 14 at the central server 58. This computer file 56 may be the validation file for each ticket 14 or another ticket-unique file separate from the validation file.

As mentioned, the lottery ticket 14 includes indicia 20 that instructs the player on how to receive the second set of predetermined play characters 54 assigned to the lottery ticket 14 via a mobile smart device 60, such as a mobile phone.

At a later time after purchase of the lottery ticket 14, the central server 58 receives a request from the player for the second set of play characters 54 via their mobile smart device 60 as instructed by the ticket 14, wherein the request includes the unique identifier 62 for the lottery ticket 14. The central server 58 verifies the activated status of the lottery ticket 14 and then retrieves the second set of predetermined play characters 54 assigned to the lottery ticket 14 from the computer file 54 associated with the ticket 14 and downloads the characters 54 to the mobile smart device 60. If not already done, in order to "play" the lottery ticket 14, the player then removes the scratch-off coating 24 from the first set of play characters 18 on the lottery ticket 14 and compares the first set of play characters 18 with the downloaded second set of play characters 54 to reveal a predetermined outcome of the lottery ticket 14. For example, as with a number of conventional scratch-off lottery ticket games, the number of matches between game play characters on the ticket (the second set of play characters 54) and a plurality of player characters on the ticket (the first set of play characters 18) reveals the predetermined win/loss outcome of the lottery ticket 14, as well as the prize amount.

Winning lottery tickets 14 can be redeemed by the player presenting the lottery ticket to the retail establishment clerk or an authorized redemption location, wherein the validation code 22 on the lottery ticket (which may the same as or different from the unique identifier 62) is used to access a validation file (which may the same as or different from the computer file 56 discussed above) that contains the ticket information needed to assure that the ticket 14 is a valid winning ticket that was legitimately purchased/activated.

The second set of play characters 54 are revealed to the player via the mobile smart device 60 in any readable format or manner, preferably in a visual representation 64 (FIGS. 5 and 6) enabled by an application running on the mobile smart device 60 that visually connects the second set of play numbers to the respective lottery ticket. For example, in FIG. 5, the visual representation 64 includes the unique ticket identifier 62 or other means to link the characters 54 to the particular lottery ticket 14 they are pre-assigned to.

Figure 4:
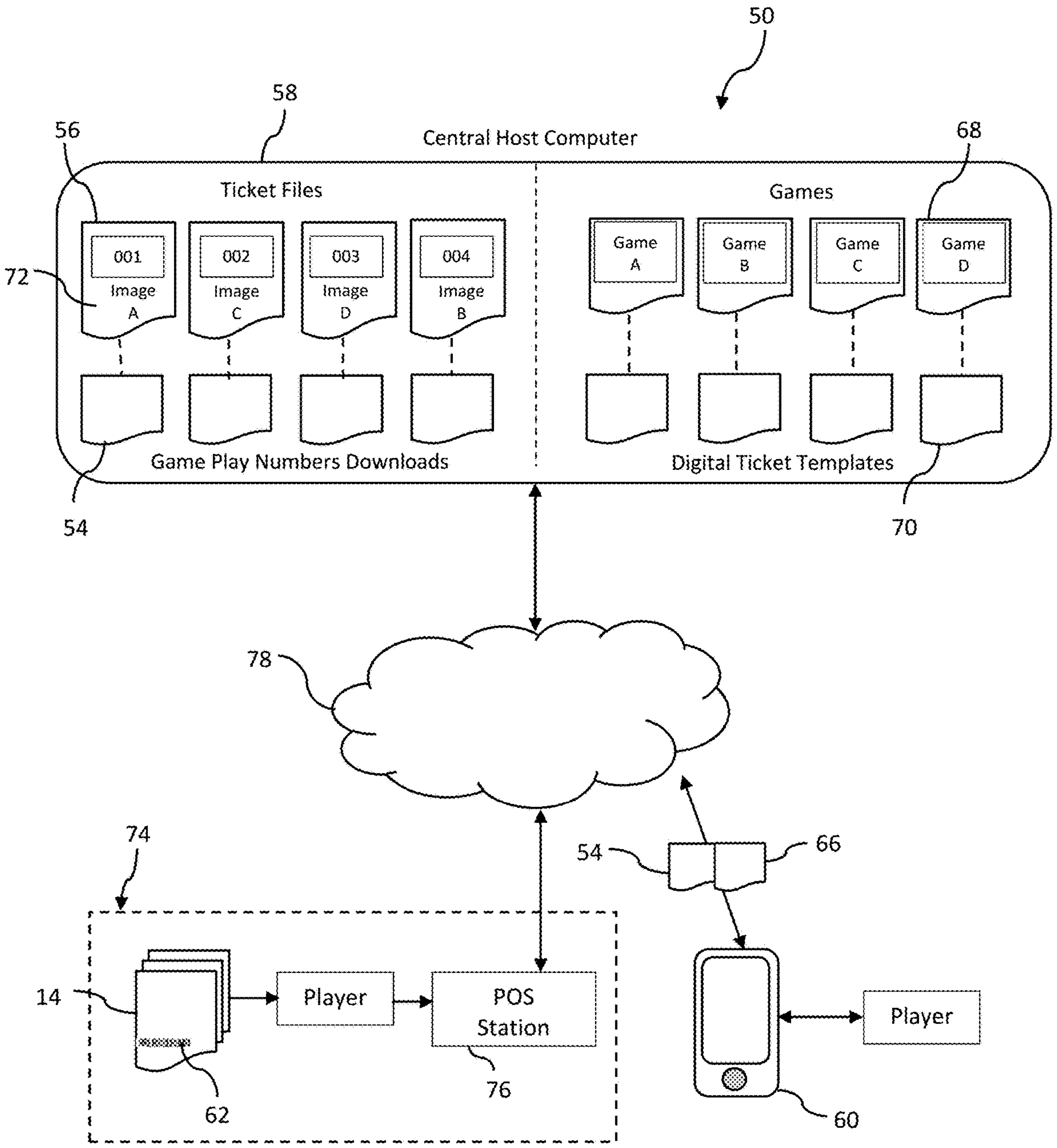
FIG. 4 is a diagram of an alternate system component and method configuration according to an alternate embodiment of the invention.
Figure 5:
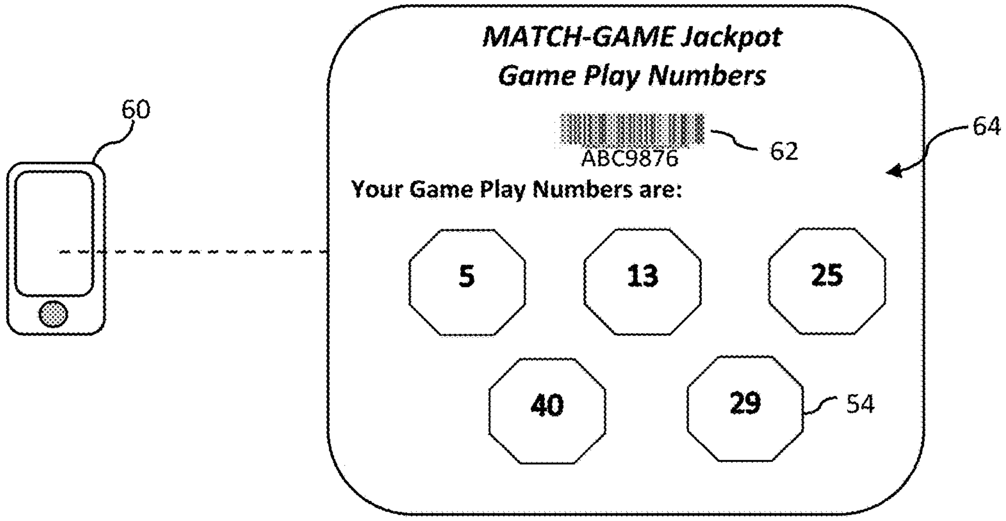
FIG. 5 is a view of a display on a mobile smart device that may be used in aspects of the present system and method embodiments.
Figure 6:
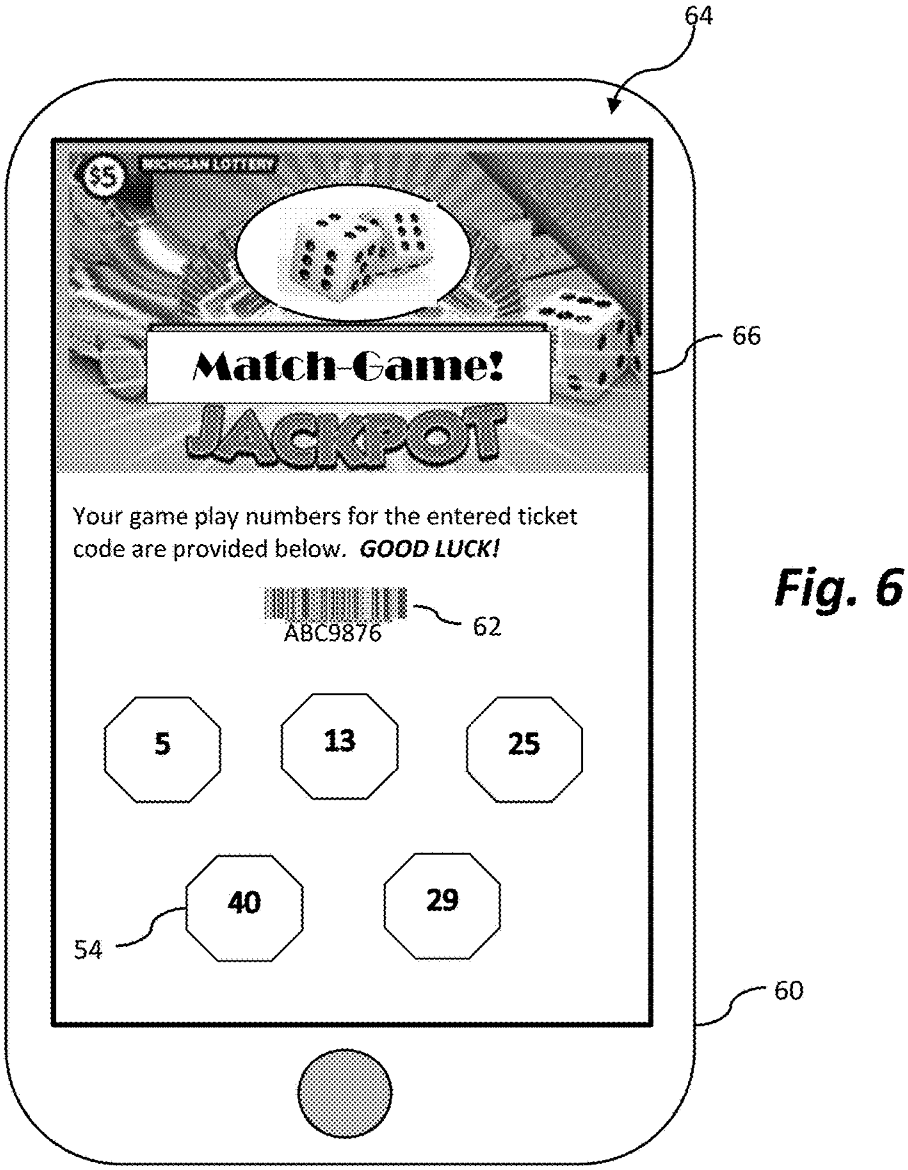
FIG. 6 is a view of an alternate display on a mobile smart device that may be used in aspects of the present system and method embodiments.

Referring to FIGS. 4 and 6, in a particularly unique embodiment, digital ticket templates 66 are created for the various common games 68 and stored at the central server 58 in template files 70, wherein a single template 66 is generic to all of the lottery tickets 14 in a common game 68. For example, a common game 68 embodied by a set or production run of the lottery tickets 14 may be a "Match-game Jackpot" theme game wherein essentially the only variable indicia on the tickets 14 is the first set of play characters 18. The graphics, instructions, and other indicia 20 are static from one ticket to the next. The digital template 66 for this particular common game 68 may be a visual representation that contains any combination of the static aspects of the common game 68. At the time of the player's request for the second set of play characters 54, the central server 58 also retrieves the digital template 66 associated with the common game 68 and transmits the template 66 with the second set of play characters 54 to the mobile smart device 60. The application running on the mobile smart device 60 combines the digital template 66 with the second set of play characters 54, for example in a simulated play area in the digital template 66 as depicted in FIG. 6, in the visual representation 64 displayed by the mobile smart device 60.

In an embodiment depicted in FIGS. 2 and 4, the method and system 50 include configuring each of the lottery tickets 14 with a security image 72. When making their request for the second set of play characters 54, the player is also prompted to identify or provide the security image 72 to the central sever 58 via their mobile smart device 60. In a desirable embodiment, the security image 72 is printed on the lottery ticket 14 at a high resolution, for example at least a 600 dpi resolution. In this way, detailed identification features can be embedded in the image 72 that are not readily reproducible by persons attempting to defraud the lottery system with forged tickets. In one embodiment, the player is instructed to scan the image 72 with their mobile smart device and transmit the image 72 to the central sever 58 along with their request for the second set of play characters 54, wherein the scanned image is compared to a saved image 72 in the computer file 56 for the individual lottery ticket 14. In an alternative embodiment, the player may be prompted to answer a question regarding the image 72, wherein the high resolution image (at least 600 dpi) enables more detail-oriented questions regarding the image 72.

It is not necessary that a unique security image 72 be generated for each lottery ticket 14. In a particular embodiment, a set A-D of the security images 72 are generated (e.g., four high resolution images of dogs or cats), wherein one of these four images is randomly assigned to and printed on each lottery ticket 14 such that a plurality of the lottery tickets 14 share the same security image 72.

FIGS. 3 and 4 depict the player's mobile smart device 60 in communication with the central (host) server 58 via any suitable communications network 78. The network 78 can be any type of communications network, such as a local area network (e.g. intranet), wide area network (e.g. Internet), or some combination thereof. The network can also include a direct connection between the mobile smart device 60 and the central server 58. In general, communication between the host server 58 and mobile smart device 60 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

It should be appreciated that the central server 58 can include a network interface for providing communications over the network 78. A network interface can include any suitable components for interfacing with one more networks, including for example, transmitters, receivers, ports, controllers, antennas, or other suitable components.

The central server 58 can be any computing device and can include one or more processors and one or more computer-readable media. The computer-readable media can store instructions which cause the processor to perform the operations described herein, as well as other functions related to conduct of the overall game for the lottery authority.

The player's mobile smart device 60 can be any portable computing device that can be used by a player to interface with the central server 58. For instance, the device 32 can be a wireless device, a personal digital assistant (PDA), portable gaming device, cellular phone, smart phone, tablet, navigation system, handheld GPS system, wearable computing device, a display having one or more processors, or other such device. In short, the player's smart device 36 can be any computer-device or system that can execute a gaming module to allow a player to interact with the host computer 58 as described herein.

The technology discussed herein makes reference to servers, computers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

Figure 7:
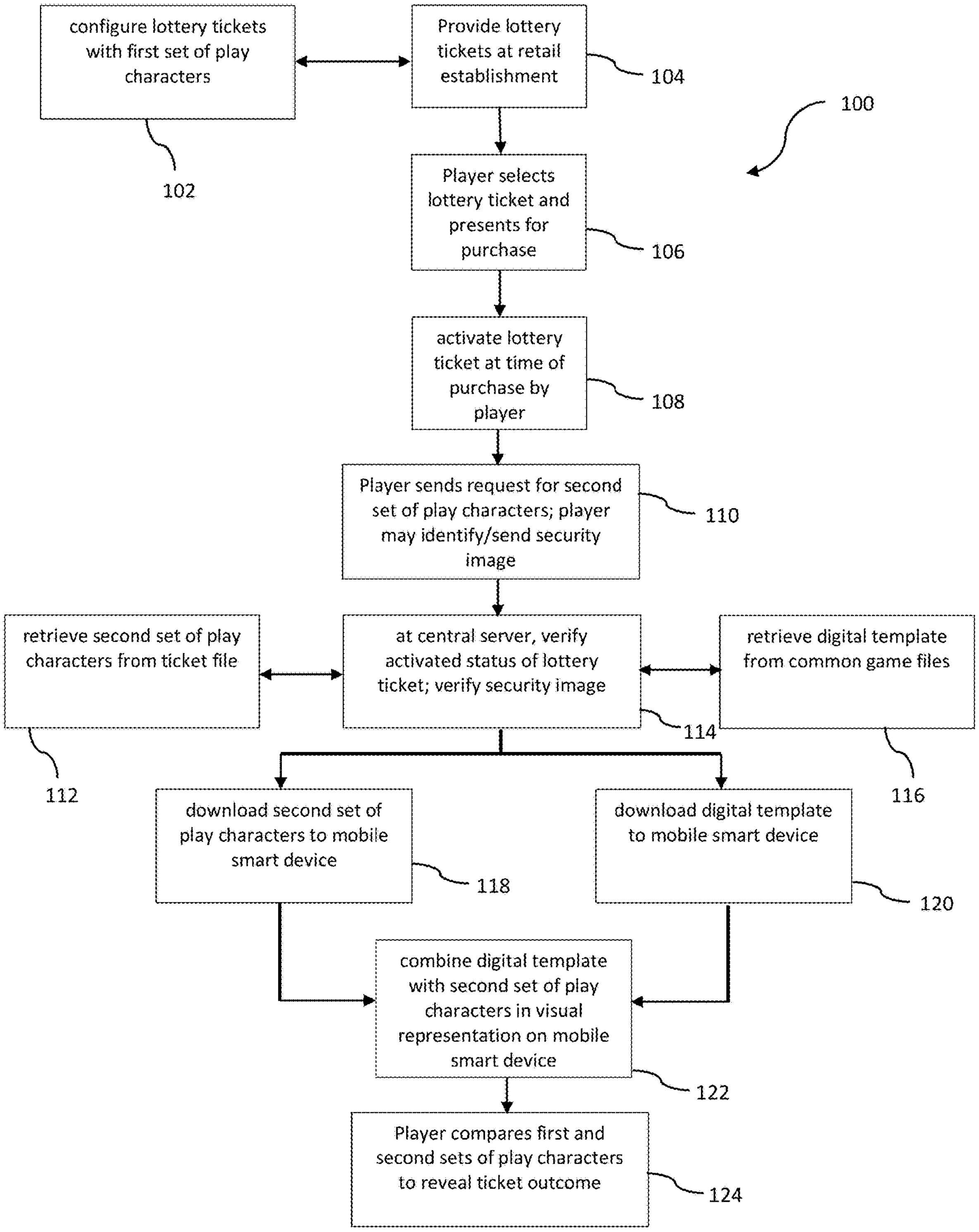
FIG. 7 is a flow chart depicting multiple method embodiments according to aspects of the invention.

FIG. 7 depicts an embodiment of a method 100 in accordance with the invention, aspects of which are discussed above.

At step 102, the lottery tickets 14 are produced with the first set of play characters 18.

At step 104, the lottery tickets 14 are provided at retail establishments in a manner that is remote from the POS station 76 so that the player can select a particular lottery ticket 14 of their choice at step 106 for purchase without intervention or assistance from the retail clerk At step 108, the player purchases one or more of the master tickets 14 (paper or electronic).

At step 108, the lottery ticket 14 presented by the player is scanned at the POS station 76 and activated by the central server 58.

At step 110, the player sends a request to the central sever 58 for download of the second set of play characters 54 as instructed by the lottery ticket 14. The request may include a scan of a security image 72 on the ticket 14 or other means of identifying aspects of the security image 72, such as requiring the player to answer a question regarding features of the security image 72.

At step 112, the central server 58 retrieves the second set of play characters 54 from the ticket-specific computer file 56 and verifies the activated status of the legitimately purchased lottery ticket 14 at step 114. If enabled, the central server 58 also retrieves the digital template 66 associated with the common game 68 of the lottery ticket 14 at step 116.

At step 118, the central server downloads the second set of play characters 54 to player's mobile smart device 60, as well as the corresponding digital template 66 (if such feature is enabled) at step 120.

At step 122, the application running on the mobile smart device 60 combines the digital template 66 with the second set of play characters 54 in a visual representation 64 displayed by the mobile smart device 60.

At step 124, the player compares the first set of play characters 18 with the downloaded second set of play characters 54 to reveal the predetermined outcome of the lottery ticket 14.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A method for conducting a scratch-off lottery ticket game, comprising:

configuring scratch-off lottery tickets ("lottery tickets") with a game play area containing a first set of play characters covered by a scratch-off coating, and indicia instructing a player how to receive a second set of predetermined play characters assigned to the lottery ticket via a mobile smart device, wherein the first set of play characters and the second set of predetermined play characters combine to form a complete set of play characters necessary to play a game embodied on the scratch-off lottery ticket;

at a retail establishment, providing the lottery tickets in a manner accessible to the players, wherein the player physically retrieves the lottery ticket of their choice and presents the lottery ticket for purchase;

at time of purchase of the lottery ticket by the player, flagging the lottery ticket in a computer file associated with the lottery ticket at a central server as activated for subsequent play;

at the central server, upon receiving a request from the player that identifies the lottery ticket, verifying the activated status of the lottery ticket and downloading the second set of predetermined play characters to the mobile smart device;

wherein the player removes the scratch-off coating from the first set of play characters on the lottery ticket and compares the first set of play characters with the down-loaded second set of play characters to reveal a predetermined outcome of the game embodied on the lottery tickets; and wherein the second set of predetermined play characters are presented in a visual representation on the mobile smart device, the visual representation depicting the lottery ticket provided to the player at the retail establishment with a game play area that displays the second set of predetermined play characters.

2. The method as in claim 1, wherein the lottery tickets are provided at a location in the retail establishment remote from a point-of-sale ("POS") station at the retail establishment so that the player selects the lottery ticket of their choice without assistance from a clerk at the POS station.

3. The method as in claim 1, further comprising configuring the lottery tickets with a unique identifier that is transmitted by the player via the mobile smart device to make the request for the second set of play characters, the second set of play characters retrieved from the computer file and subsequently downloaded to the mobile smart device.

4. The method as in claim 3, wherein the visual representation is enabled by an application running on the mobile smart device.

5. The method as in claim 4, further comprising downloading a digital ticket template to the mobile smart device that is generic to all of the lottery tickets in a common game, wherein the second set of play characters are combined with the digital template in the visual representation on the mobile smart device.

6. The method as in claim 5, wherein the digital templates are stored at the central server remote from the individual computer files for the lottery tickets.

7. The method as in claim 1, further comprising configuring each of the lottery tickets with a security image, wherein the player identifies or provides the security image to the central sever via their mobile smart device when making their request for the second set of play characters, the security image being a pictorial representation separate from a validation or ticket identifier code also provided on the lottery ticket.

8. The method as in claim 7, wherein the security image is printed on the lottery ticket with at least a 600 dpi resolution.

9. The method as in claim 8, wherein the security image is scanned by the mobile smart device and transmitted to the central server.

10. The method as in claim 7, wherein a plurality of the security images are generated and randomly assigned to the lottery tickets such that a plurality of the lottery tickets have the same one of the security images.

11. A system for conducting a scratch-off lottery ticket game, comprising:

a plurality of scratch-off lottery tickets ("lottery tickets"), each of the lottery tickets comprising a unique identifier and a game play area containing a first set of play characters covered by a scratch-off coating, and indicia instructing a player how to receive a second set of predetermined play characters assigned to the lottery ticket via a mobile smart device, wherein the lottery tickets are presentable at a retail establishment in a manner such that the player physically retrieves the lottery ticket of their choice and presents the lottery ticket to a point-of-sale ("POS") station for purchase;

the first set of play characters and the second set of predetermined play characters combining to form a complete set of play characters necessary to determine an outcome of a game embodied on the lottery ticket;

an individual computer file associated with each of the lottery tickets, the computer file comprising a second set of predetermined play characters assigned to the lottery ticket;

a central server, wherein the computer files are stored at or accessible by the central server, the central server configured to:

at a time of purchase of the lottery ticket by the player, flag the lottery ticket in the computer file associated with the lottery ticket as activated for subsequent play;

upon receiving a request from the player with the unique identifier of the lottery ticket, verify the activated status of the lottery ticket;

retrieve and download the second set of predetermined play characters from the computer file to the mobile smart device, wherein the second set of predetermined play characters are presented in a visual representation on the mobile smart device, the visual representation depicting the lottery ticket provided to the player at the retail establishment with a dame play area that displays the second set of predetermined play characters; and wherein the player removes the scratch-off coating from the first set of play characters on the lottery ticket and compares the first set of play characters with the down-loaded second set of play characters to reveal a predetermined outcome of the game embodied on the lottery ticket.

12. The system as in claim 1, wherein the unique identifier on the lottery ticket is a code or alpha-numeric sequence that is transmitted by the player via the mobile smart device to make the request for the second set of play characters.

13. The system as in claim 1, wherein the central server further comprises a digital ticket template that is generic to all of the lottery tickets in a common game, the central server further configured to download the digital template to the mobile smart device wherein the second set of play characters are combined with the digital template in the visual representation on the mobile smart device.

14. The system as in claim 13, wherein the digital templates are stored at the central server remote from the individual computer files for the lottery tickets.

15. The system as in claim 1, wherein each of the lottery tickets further comprises a security image, wherein the player identifies or provides the security image to the central sever via the mobile smart device when making their request for the second set of play characters, the security image being a pictorial representation separate from a validation or ticket identifier code also provided on the lottery ticket.

16. The system as in claim 15, wherein the security image is printed on the lottery ticket with at least a 600 dpi resolution.

17. The system as in claim 16, wherein the security image is scannable by the mobile smart device and transmitted to the central server.

18. The system as in claim 15, further comprising a plurality of the security images, wherein the security images are randomly assigned to each of the lottery tickets such that a plurality of the lottery tickets have the same one of the security images.

* * * * *